W. G. BLOSS.
IRRIGATION SYSTEM.
APPLICATION FILED JULY 19, 1912.
1,077,869.
Patented Nov. 4, 1913.
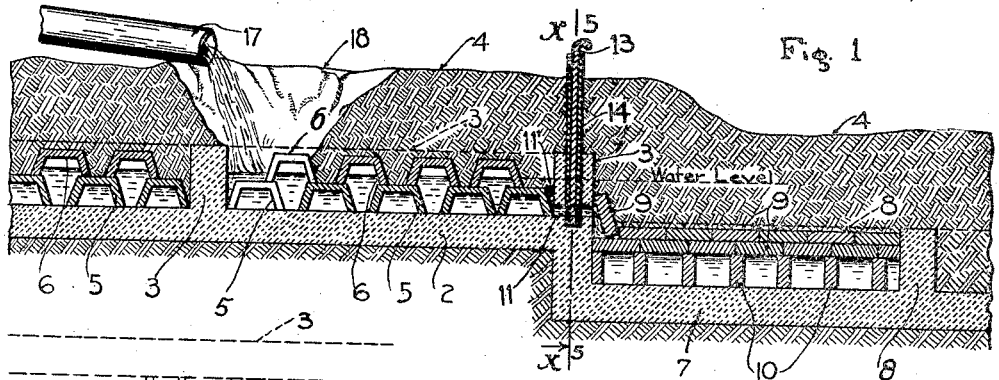
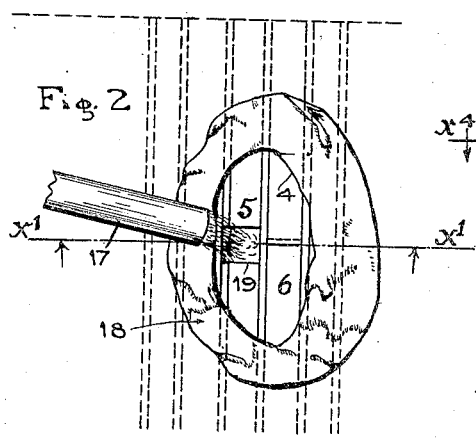
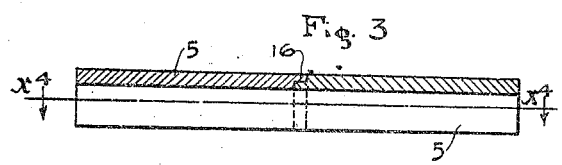
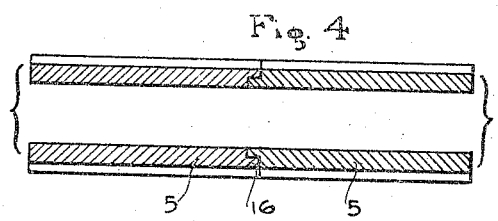
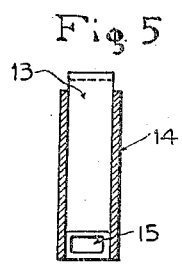
Witnesses:
E. Maas
Wm. F. Bixby
Inventor.
William G. Bloss
By Albert H. Merrill
Atty

UNITED STATES PATENT OFFICE.

WILLIAM G. BLOSS, OF LOS ANGELES, CALIFORNIA.

IRRIGATION SYSTEM.

1,077,869.  Specification of Letters Patent.  Patented Nov. 4, 1913.

Application filed July 19, 1912. Serial No. 710,482.

*To all whom it may concern:*

Be it known that I, WILLIAM G. BLOSS, a citizen of the United States, residing in the city and county of Los Angeles, State of California, have invented a new and useful Irrigation System, of which the following is a specification.

An object of this invention is to provide a durable, simply constructed irrigation system, and one that can be relied upon to thoroughly moisten the soil without interfering with the tilling thereof.

A further object of the invention is to provide for irrigating ground having an uneven surface, or having a general slope.

Further objects and advantages may hereinafter appear.

The invention consists in the various parts, combinations of parts, and details of construction hereinafter described in connection with the accompanying drawings, and then definitely pointed out in the claim.

Referring to the accompanying drawings, which illustrate the invention, Figure 1 is a vertical section of this irrigation system, the line of section passing through Fig. 2 on line $x^1$—$x^1$ thereof, illustrating the subterranean floor and soil-supporting structure mounted on said floor; Fig. 2 is a plan view of a portion of Fig. 1; Fig. 3 is a longitudinal section of two of the tile to illustrate the manner of joining said tile; Fig. 4 is a transverse section on line $x^4$—$x^4$ of Fig. 3; Fig. 5 is a vertical section of one of the gates on line $x^5$—$x^5$ of Fig. 1.

Referring in detail to the drawings, a subterranean reservoir is provided, the same consisting of a liquid-tight floor 2 and inclosing walls 3, the top of said walls 3 being buried far enough below the surface of the soil 4 to be beneath the reach of agricultural implements. Upon the floor of said reservoir is laid a lower layer of tile 5 in rows which are spaced apart from each other as shown in section in Fig. 1. The spaces between said lower rows of tile are bridged by rows of upper tile 6, all of said tile desirably being in the form of inverted troughs. In irrigation, the water level is maintained a little above the tops (or rather, inverted bottoms) of the lower layer of tile. The lower tile are loosely seated upon the floor, and the upper tile being loosely seated upon the lower tile, the water readily percolates between and within the tile and is absorbed by the soil 4. The two layers of tile form a sort of false bottom over the main floor or bottom 2 to provide a chamber for the water between the soil and the main bottom or floor 2. Better results are secured when the tile of the upper layer are in the form of inverted troughs and are spaced slightly apart, this arrangement permitting an additional supply of the water to rise under the tile up to a level above the earth in the spaces between the tile and to be held in the reservoirs thus formed until absorbed into the earth. A lower floor 7 is also provided, said floor being inclosed by wall 8. Tile like the tile 5 and 6 already referred to, may be laid upon said lower floor, or overlapping rows of brick 9 may be placed thereon, said brick being supported by piers 10.

One or more openings 11 are provided through wall 3 to permit the water to escape from the upper reservoir to the lower reservoir and rise to a level somewhat above the tops of the upper layer of brick 9 so as to be absorbed by the soil 4. The flow of water through said opening or passage 11 is preferably controlled by a gate 13 working in an upright guide 14 provided with an opening 15 which registers with the passage 11 through wall 3. Small stones 11' may be placed opposite the inlet end of passage 11 to keep the soil from obstructing said passage. Or, if desired, the tile may be so arranged that their open ends will come opposite to one or more of said passages 11. One of the brick 9 may be leaned up as shown to keep the outlet end of said passage from being obstructed. The tile will probably be found more satisfactory in practical use, but the brick-work is shown to illustrate how the system may be constructed when the tile are not readily obtainable. In both forms of the invention the joints of the brick or of the tile are made to overlap so as to keep the soil from sifting down into the reservoir. The joints 16 of the tile 5 are illustrated in Figs. 3 and 4. The upper tile 6 are provided with like joints.

As shown in Figs. 1 and 2 water is supplied from a conduit 17 which discharges into a pit 18 formed by digging away the soil down to the supporting structure formed by the tile 5 and 6. Two of the lower tile are desirably spaced apart as shown at 19 so as to allow the water free access into the open ends thereof.

This system of irrigation, after being once built is practically indestructible. It has been tested and found to operate satisfactorily.

It is to be understood that the water may be supplied by other means than that illustrated in the drawings, and that various changes of construction, such as would fall within the scope of the appended claim, may be made without departing from the spirit of the invention.

I claim:

In an irrigation system, a subterranean floor, a soil-supporting structure resting upon said floor to form a water chamber and separate the earth from said floor over a relatively large continuous area thereof, a subterranean wall inclosing said floor, another subterranean floor at a lower level than the first named floor, a structure to form a water chamber above said lower floor, a subterranean wall inclosing said lower floor on all sides, a portion of said walls being in common, and a water gate to control the flow of water from the upper chamber to the lower chamber, said walls, being disposed at a sufficient distance below the surface of the ground to provide for the cultivation by traction propelled implements of a field having pronounced variations of surface level and embracing a series of said reservoirs.

In testimony whereof I have hereunto signed my name in the presence of two subscribing witnesses at Los Angeles, in the county of Los Angeles and State of California, this 11th day of July 1912.

WILLIAM G. BLOSS.

Witnesses:
WILLIAM G. BLOSS,
JESSE W. WHANN.